United States Patent
Ikeda et al.

(10) Patent No.: US 8,777,668 B2
(45) Date of Patent: Jul. 15, 2014

(54) WIRING MEMBER

(75) Inventors: Tomohiro Ikeda, Makinohara (JP); Katsunori Sato, Makinohara (JP); Hiroyuki Kato, Makinohara (JP)

(73) Assignee: Yazaki Corporation, Tokyo (JP)

( * ) Notice: Subject to any disclaimer, the term of this patent is extended or adjusted under 35 U.S.C. 154(b) by 68 days.

(21) Appl. No.: 13/502,953

(22) PCT Filed: Apr. 21, 2011

(86) PCT No.: PCT/JP2011/059873
§ 371 (c)(1),
(2), (4) Date: Apr. 19, 2012

(87) PCT Pub. No.: WO2011/132755
PCT Pub. Date: Oct. 27, 2011

(65) Prior Publication Data
US 2012/0231638 A1  Sep. 13, 2012

(30) Foreign Application Priority Data
Apr. 22, 2010 (JP) ................................. 2010-099194

(51) Int. Cl.
*H01R 24/00* (2011.01)
(52) U.S. Cl.
USPC .......................................................... 439/627
(58) Field of Classification Search
USPC ............... 439/736, 627, 500, 77; 340/636.13; 361/749
See application file for complete search history.

(56) References Cited

U.S. PATENT DOCUMENTS

| 6,261,719 | B1 | 7/2001 | Ikeda et al. | |
| 7,294,020 | B2 * | 11/2007 | Zhao et al. | 439/627 |
| 8,545,271 | B2 * | 10/2013 | Henmi | 439/627 |
| 2002/0051345 | A1 * | 5/2002 | Serizawa et al. | 361/749 |
| 2010/0271223 | A1 * | 10/2010 | Ohkura et al. | 340/636.13 |

FOREIGN PATENT DOCUMENTS

| JP | 62-43465 U | 3/1987 |
| JP | 6243465 U | 3/1987 |
| JP | 2000149909 A | 5/2000 |
| JP | 2001-185837 A | 7/2001 |
| JP | 2001345082 A | 12/2001 |
| JP | 2002-164034 A | 6/2002 |
| JP | 2002164034 A | 6/2002 |

(Continued)

OTHER PUBLICATIONS

International Search Report dated Aug. 2, 2011 in counterpart international application No. PCT/JP2011/059873.
Written Opinion dated Aug. 2, 2011 in counterpart international application No. PCT/JP2011/059873.

(Continued)

*Primary Examiner* — Tulsidas Patel
*Assistant Examiner* — Phuongchi T Nguyen
(74) *Attorney, Agent, or Firm* — Sughrue Mion, PLLC

(57) ABSTRACT

A wiring member is provided that can suppress an influence due to deviation of a position of connection as much as possible so as to maintain a good wiring state. The wiring member 11 is formed of a flexible printed circuit board to be connected to terminals of a plurality of batteries. The wiring member 11 includes a straight section 21 which is disposed along arrangement of aligned terminals, and a plurality of branch sections 22 which extend toward positions of connection to the respective terminals from the straight section 21 so as to be connected thereto. The branch sections 22 have deflection portions 32 which can be deformed in response to displacement of the straight section 21 in the longitudinal direction.

7 Claims, 7 Drawing Sheets

(56) References Cited

FOREIGN PATENT DOCUMENTS

| | | |
|---|---|---|
| JP | 2004-95357 A | 3/2004 |
| JP | 200495357 A | 3/2004 |
| JP | 2004-327311 A | 11/2004 |

OTHER PUBLICATIONS

Office Action dated Jan. 21, 2014 issued by the State Intellectual Property Office of the People's Republic of China in counterpart Chinese Patent Application No. 201180004258.3.

Office Action, dated Apr. 8, 2014, issued by the Japanese Patent Office in counterpart Japanese Application No. 2010-099194.

* cited by examiner (a)　　　　　　　　　　(b)

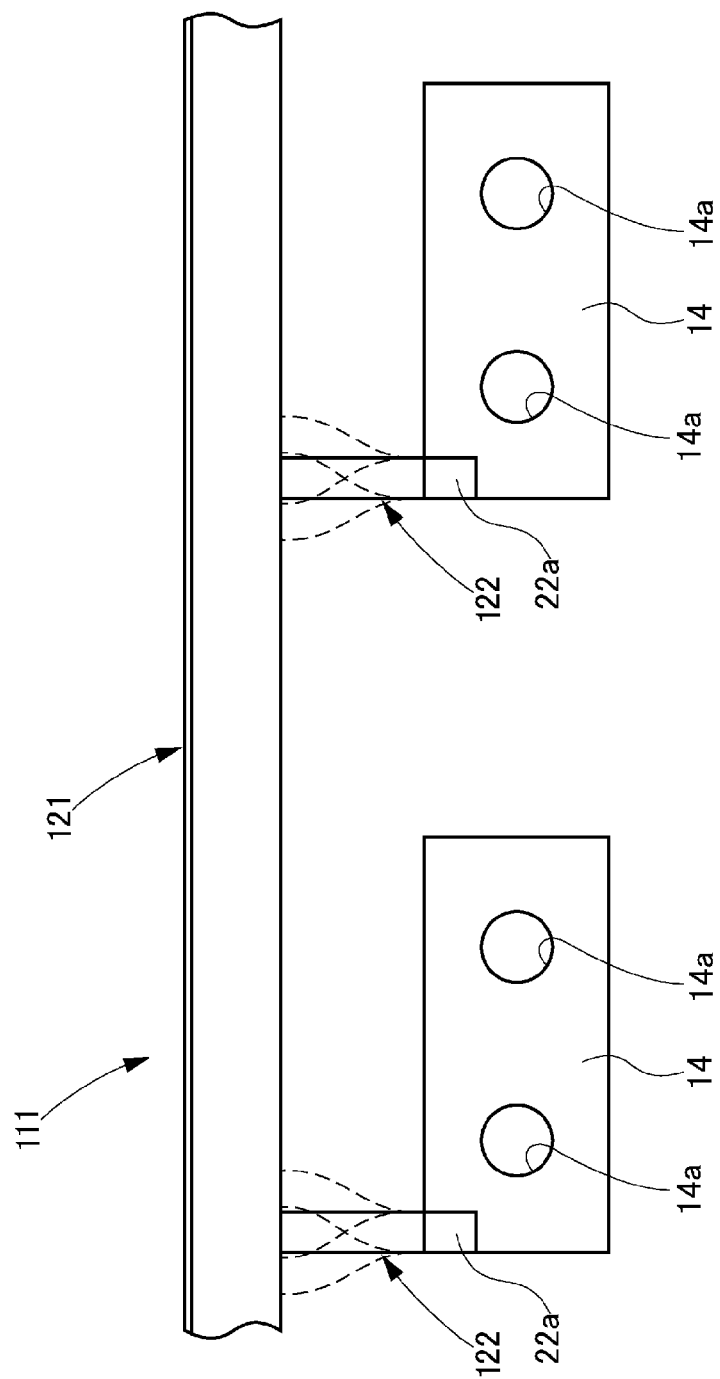

WIRING MEMBER

TECHNICAL FIELD

The present invention relates to a wiring member which is to be connected to a battery mounted on a vehicle such as an electric vehicle, a hybrid car or the like.

BACKGROUND ART

As eco-friendly vehicles, electric vehicles or hybrid cars are increasing. Such vehicle includes, mounted thereon, a power supply device constituted by a battery assembly in which a plurality of batteries are coupled to one another.

As those kinds of power supply devices, there is one which has a printed circuit board constituted by a hard board on which signal output lines for outputting voltages of batteries to the outside are wired by being connected to the batteries in order to detect the voltages of the respective batteries. The printed board and bus bars for wiring fixed to terminals of the respective batteries are coupled to each other with coupling terminals (see, for example, Patent Document 1).

PRIOR ART DOCUMENTS

Patent Documents

Patent Document 1: JP-A-2001-345082

SUMMARY OF INVENTION

Problems that the Invention is to Solve

In recent years, it is discussed that a flexible printed circuit board (FPC) is used as a wiring member for detecting a voltage of a battery instead of a hard board in consideration of saving of weight of a power supply device. In this case, the wiring member is configured to have a straight section extending along arrangement of the batteries and a branch section that branches from the straight section to each of bus bars of the respective batteries.

While, since an outside dimension of each battery has a dimensional tolerance, when a plurality of batteries are coupled to one another, the dimensional tolerances are accumulated, and thereby a position of connection of the branch section to a terminal of the battery is deviated. Therefore, when a flexible printed circuit board is used as a wiring member, the wiring member is twisted by the deviation of the position of connection and an unreasonable force is applied to a wiring pattern, which possibly gives an influence to a good wiring state.

The invention is made in view of the above circumstances, and the purpose of the invention is to provide a wiring member which can suppress an influence due to the deviation of the position of connection as much as possible so as to maintain a good wiring state.

Means for Solving the Problems

The purpose of the invention can be achieved by the following configurations.

(1) A wiring member which is formed of a flexible printed circuit board to be connected to terminals of a plurality of batteries, includes a straight section which is disposed along an arrangement of the aligned terminals, and a plurality of branch sections which extend toward positions of connection to the respective terminals from the straight section so as to be connected to the terminals, and the branch sections have deflection portions which can be deformed in response to a displacement of the straight section in a longitudinal direction thereof.

In accordance with the wiring member, the deflection portions which can be deformed in response to displacement of the straight section in the longitudinal direction thereof are provided on the branch sections which extend toward the respective terminals from the straight section disposed along the arrangement of the terminals of the plurality of aliened batteries so as to be connected to the terminals. Therefore, even when dimensional tolerances in outside dimensions of the batteries are accumulated, and thereby the position of connection to the terminal of the branch section is deviated it is possible to absorb the deviation by deformation of the deflection portion. With this, it is possible to eliminate a trouble that a wiring member is twisted by deviation of the connection positions and an unreasonable force is applied to the wiring member so that a good wiring state can be maintained with high reliability.

(2) The wiring member having the structure of the above aspect (1), is so configured that the straight section includes a second deflection portion which is deformed in response to expansion or contraction of the straight section in the longitudinal direction thereof.

In accordance with the above wiring member, since the straight section includes the second deflection portion which is deformed in response to expansion or contraction of the straight section in the longitudinal direction thereof, deviation of the connection positions to be connected to the terminals can be further absorbed by the deformation of the second deflection portion also at the straight section so that a good wiring condition can be surely maintained.

(3) The wiring member having the structure of the above aspect (2), is so configured that the second deflection portion is formed in such a manner that a plurality of projections provided at a predetermined pitch on a plate to be attached to the batteries are inserted into a plurality of hole sections which are opened on the straight section at a pitch larger than the pitch of the projections.

In accordance with the above wiring member, since the second deflection portion can be formed only by inserting the plurality of projections provided on the plate such as a battery connection plate or the like at the predetermined pitch into the plurality of hole sections opened on the straight section at the pitch larger than the pitch of the projections, the wiring member capable of absorbing deviation of the connection position to be connected to the terminal can be obtained at extremely low cost.

BRIEF DESCRIPTION OF THE DRAWINGS

FIG. 6(a) shows a state in which the straight section is displaced in the direction of arrow A and FIG. 6(b) shows a state in which the straight section is displaced in the direction of arrow C.

FIG. 7 is a plan view showing a wiring member according to a related art example.

MODE FOR CARRYING OUT THE INVENTION

A preferable embodiment according to the invention is described below with reference to accompanying drawings.

Figure 1:
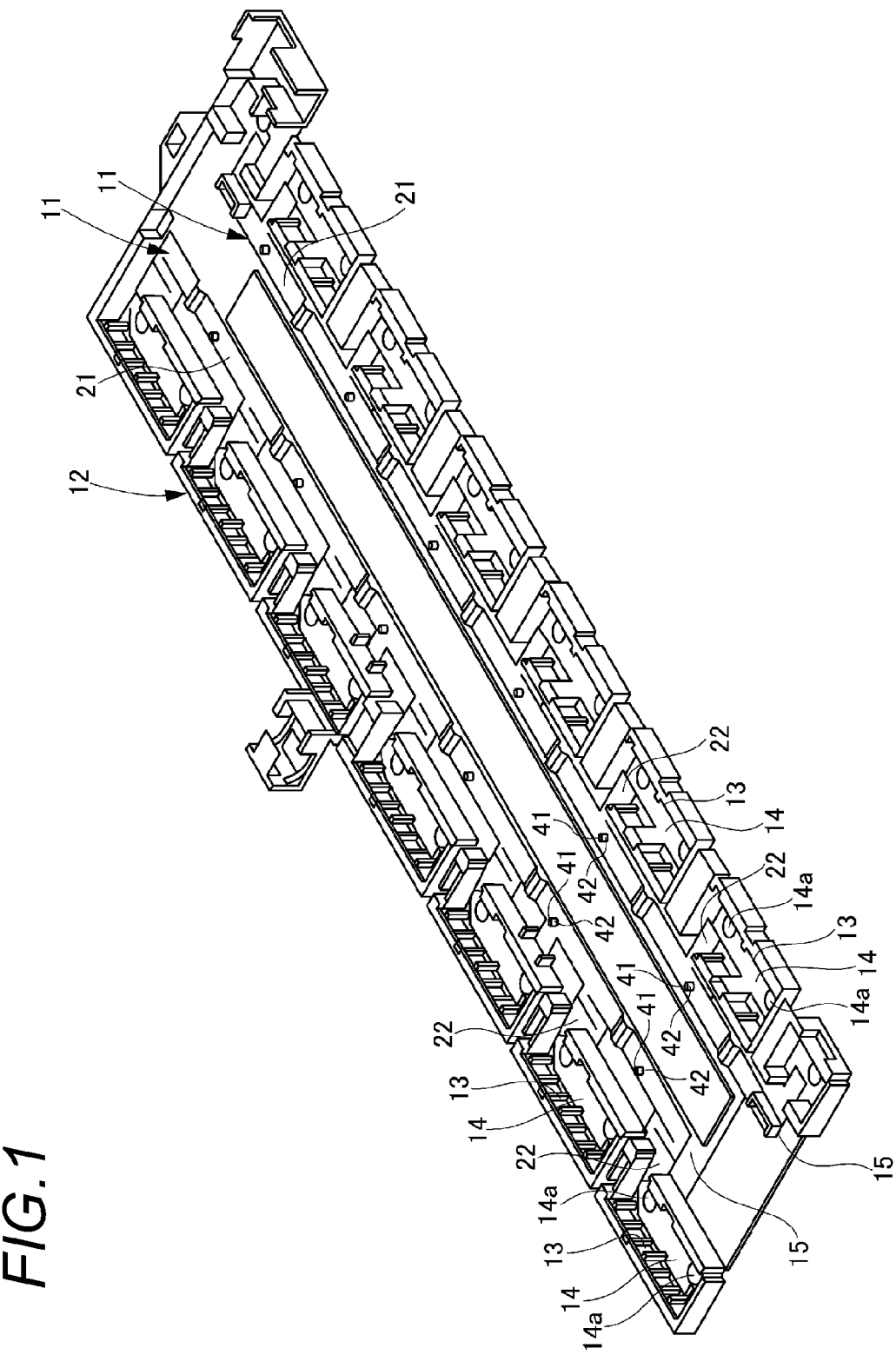
FIG. 1 is a perspective view showing a battery connection plate having, wired thereon, a wiring member according to a first embodiment of the invention.
Figure 2:
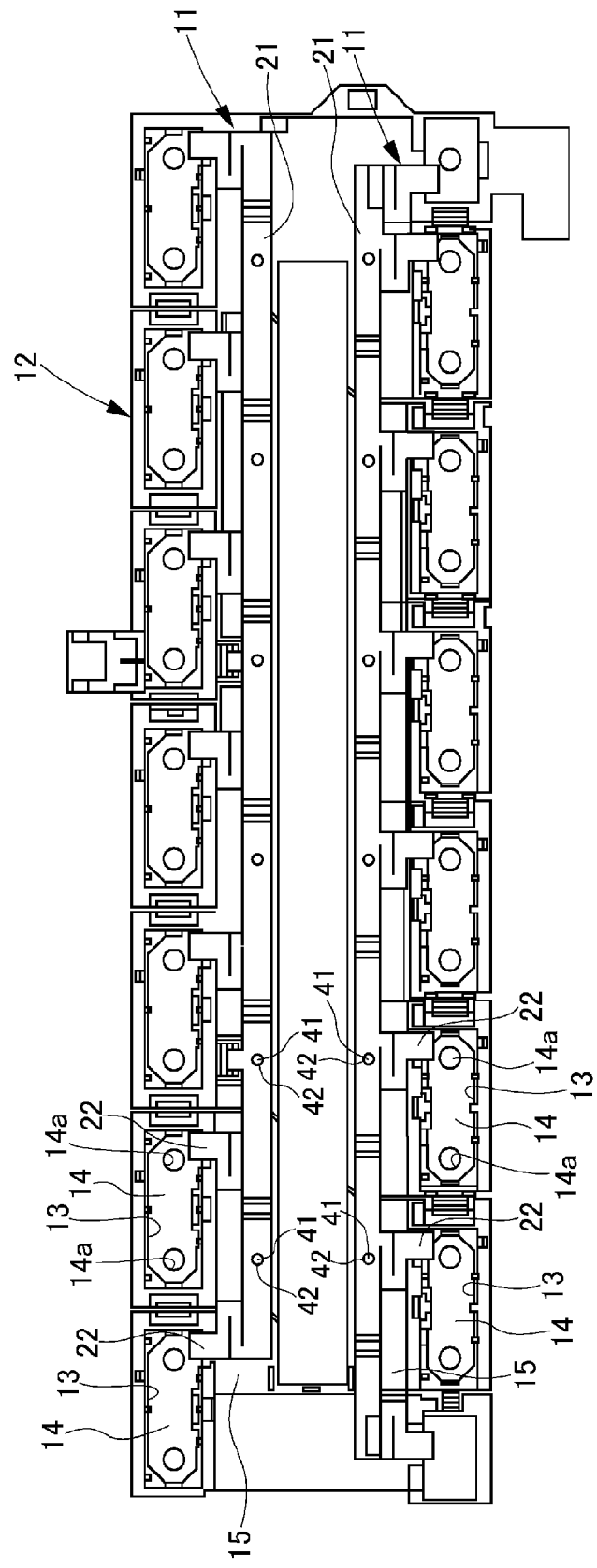
FIG. 2 is a plan view showing the battery connection plate having, wired thereon, the wiring member according to the first embodiment of the invention.

As shown in FIGS. 1 and 2, wiring members 11 according to an embodiment of the invention are attached to a battery connection plate (plate) 12. The battery connection plate 12 is formed of a synthetic resin and has a plurality of bus bar attachment sections 13 at both right and left sides. Bus bars 14 each made of a metal plate are fitted to the bus bar attachment sections 13. A pair of connection holes 14a are formed on each of the bus bars 14, and terminals of a plurality of batteries (not shown) which are coupled to one another are inserted into the connection holes 14a. By fastening nuts to the terminals of the batteries, the terminals are connected to the bus bars 14 so as to be in conductive states with the bus bars 14.

Wiring member attachment sections 15 are provided on the battery connection plate 12 along the bus bar attachment sections 13, and the wiring members 11 are attached to the wiring member attachment sections 15. Each of the wiring members 11 is formed of a flexible printed circuit board (FPC), and is provided on the battery connection plate 12 as a circuit for detecting a voltage of each of the batteries.

Figure 3:
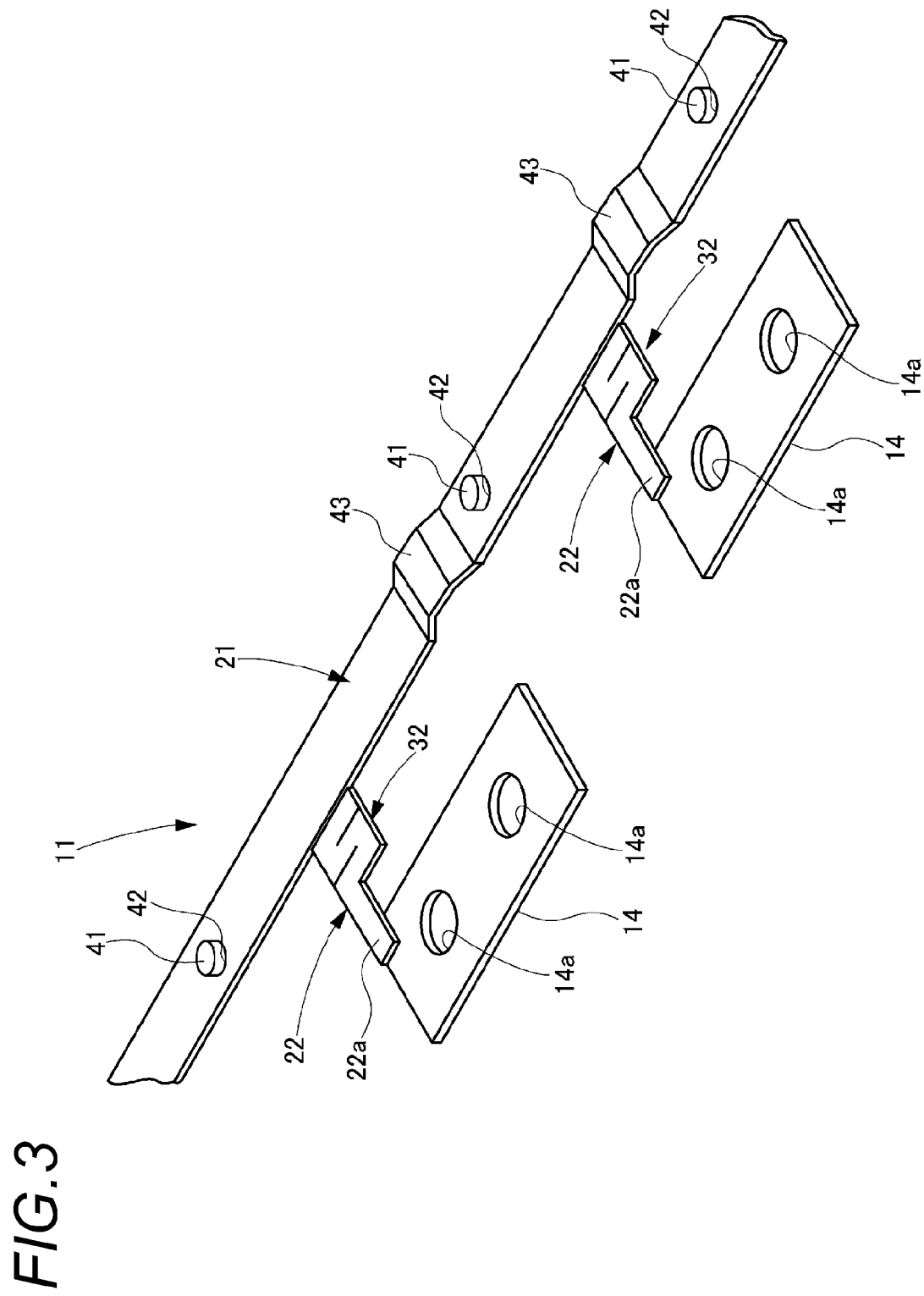
FIG. 3 is a perspective view showing the wiring member according to the first embodiment of the invention.
Figure 4:
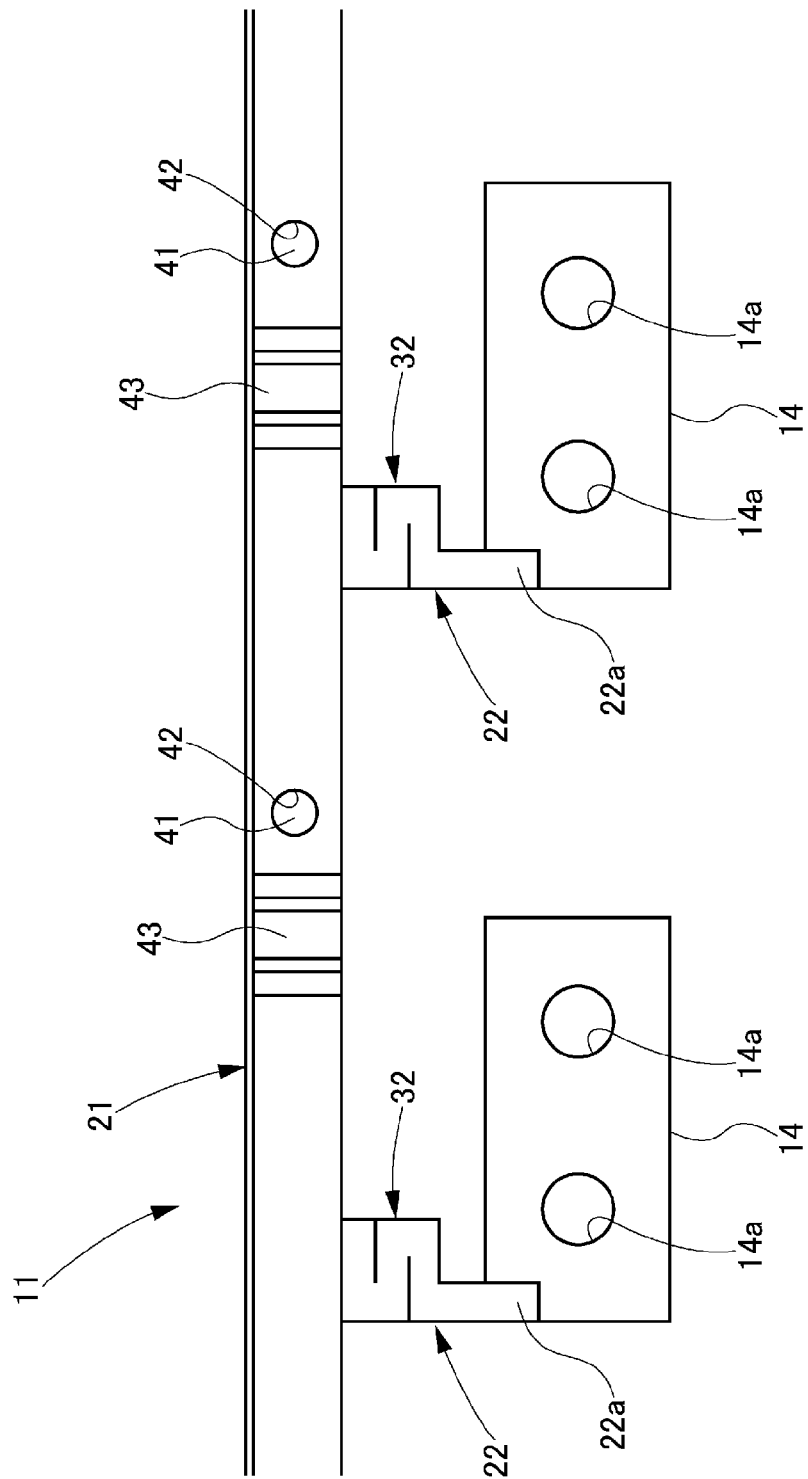
FIG. 4 is a plan view showing the wiring member according to the first embodiment of the invention.

As shown in FIGS. 3 and 4, each of the wiring member 11 has a straight section 21 provided along arrangement of the terminals of the batteries and a plurality of branch sections 22 each extending in the side direction. In each of the branch sections 22 of the wiring member 11, a connection end 22a formed of its tip portion is connected to each bus bar 14, and thereby each of the branch sections 22 is electrically connected to the terminal of the battery through the bus bar 14.

Figure 5:
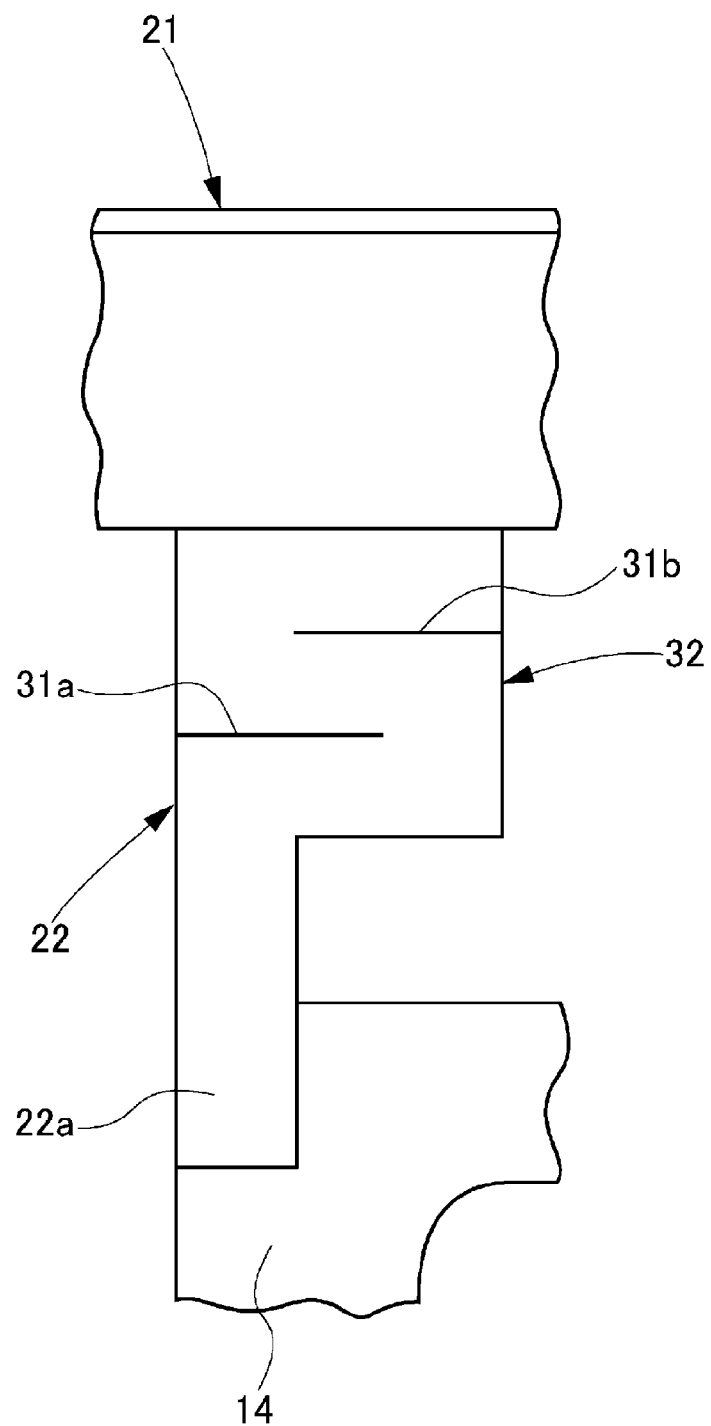
FIG. 5 is an exploded plan view showing a branch section of the wiring member shown in FIG. 4.

As shown in FIG. 5, in each of the branch sections 22, cutout portions 31a and 31b are alternately formed along the longitudinal direction from the width direction (the right and left direction), respectively so that it is formed in an S-shape as viewed from the upper side, and thereby the S-shaped portion is made to be a deflection portion 32. The deflection portion 32 is adapted to be deformable in response to displacement (expansion or contraction) in the longitudinal direction (axial direction) of the straight section 21 (described later).

Figure 6:
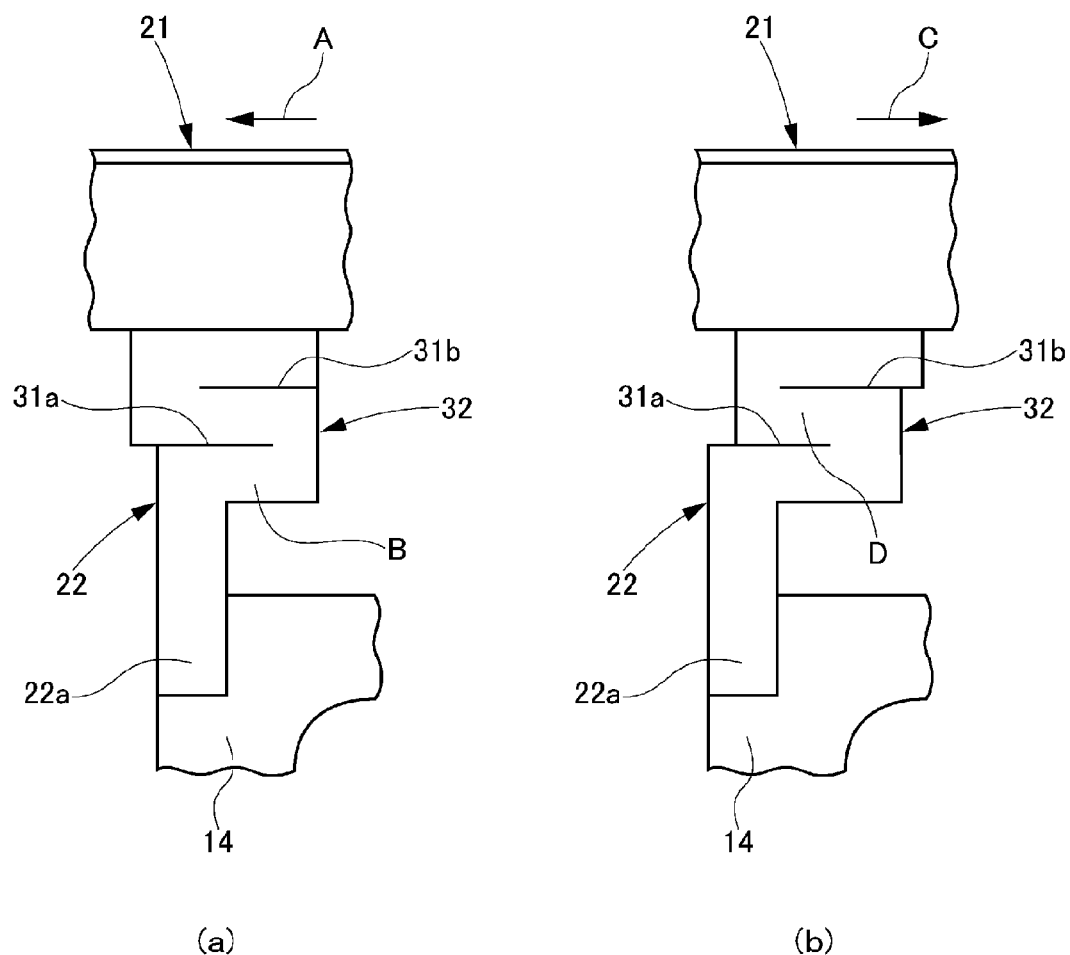
FIGS. 6(a) and 6(b) are exploded plan views showing a deflection state at the branch section of the wiring member shown in FIG. 4.

As shown in FIG. 6(a), when the straight section 21 is displaced in a direction of arrow A, a part of the cutout portion 31a at a connection end 22a side (a part B in FIG. 6(a)) is bent in a direction perpendicular to its face so that the deviation is absorbed at the deflection portion 32 of the branch section 22. As shown in FIG. 6(b), when the straight section 21 is displaced in a direction of arrow C, a part of the cutout portion 31b at a connection end 22a side (a part D in FIG. 6(b)) is bent in a direction perpendicular to its face so that the deviation is absorbed at the deflection portion 32 of the branch section 22.

In addition, a plurality of projections 41 formed at a predetermined pitch are provided on the wiring member attachment section 15 of the battery connection plate 12. In contrast to the above, a plurality of hole sections 42 are formed on the straight section 21 of the wiring member 11. The projections 41 of the battery connection plate 12 are inserted into the respective hole sections 42.

A pitch of the hole sections 42 is made to be wider than the predetermined pitch of the projections 41 of the battery connection plate 12. With this, when the straight section 21 of the wiring member 11 is placed on the wiring member attachment section 15 and the projections 41 are inserted into and engaged with the respective hole sections 42, a second deflection portion 43 which is bent upward at a portion between the hole sections 42 by an extent of a difference between the pitches is formed on the straight section 21. The second deflection portion 43 is deformed in response to expansion or contraction of the straight section 21 in the longitudinal direction so that the expansion or contraction can be absorbed.

Here, in a case where deviation occurs in such a manner that a distance between positions of connection to the terminals is increased by accumulation of dimensional tolerances of outside dimensions of the plurality of coupled batteries, the deflection of the second deflection portion 43 of the straight section 21 is decreased so that the deviation is absorbed. But, in a case where deviation occurs in such a manner that a distance between positions of connection to the terminals is decreased by the dimensional tolerances, the deflection of the second deflection portion 43 of the straight section 21 is increased so that the deviation is absorbed.

As described above, in accordance with the wiring member 11 according to the embodiment, the deflection portion 32 which is deformable in response to displacement of the straight section 21 in the longitudinal direction of the straight section 21 is provided on each of the plurality of branch sections 22 which extend toward the respective terminals so as to be connected to the terminals with the bus bars 14, respectively, the straight section 21 being provided along the arrangement of the terminals of the batteries. Therefore, even when dimensional tolerances of outside dimensions of the plurality of coupled batteries are accumulated, and thereby a position of connection of the branch section 22 to the terminal is deviated, the deviation can be absorbed by deformation of the deflection portion 32. With this, it is possible to eliminate a trouble that an unreasonable force is applied to the wiring member 11 due to the deviation of the position of connection to the terminal. That is, in accordance with the embodiment, an influence due to deviation of the position of connection to the terminal of the battery can be suppressed as much as possible and a good wiring state can be maintained with high reliability.

In addition, since the second deflection portion 43 which is deformed in response to expansion or contraction of the straight section 21 in the longitudinal direction, is provided on the straight section 21, deviation of the position of connection to the terminal of the battery can be absorbed by deformation of the second deflection portion 43, and the good wiring state can be further surely maintained.

Moreover, since the second deflection portion 43 can be formed only by inserting the plurality of projections 41 provided on the battery connection plate 12 at the predetermined pitch into the respective plurality of hole section 42 which are opened on the straight section 21 at the pitch wider than the pitch of the projections 41, it is possible to form, at extremely low cost, the wiring member 11 capable of absorbing deviation of the position of connection to the terminal.

Here, in order to describe an additional advantage of the invention, a wiring member 111 according to a reference example is shown in FIG. 7. As shown in FIG. 7, while the wiring member 111 is formed of a flexible printed circuit board, a branch section 122 does not have a portion corresponding to the deflection portion 32 in the former embodiment. In addition, a straight section 121 does not have a portion corresponding to the second deflection portion 43 in the former embodiment.

In the above wiring member 111, in a case where dimensional tolerances of outside dimensions of a plurality of coupled batteries are accumulated, and thereby a position of connection of the branch section 122 to a bus bar 14 connected to a terminal of the battery is deviated, a bending force in a surface direction acts so as to cause a torsion to be generated on the branch section 122. Particularly, when deviation occurs in a direction of expanding an interval of positions of connection to the terminals with respect to an interval between the branch sections 122, a tensile force is generated also on the straight section 121.

Here, regarding the flexible printed circuit board, bending in a direction intersecting with its face is easy, but deformation in the surface direction is hard. Therefore, when a torsion occurs or a tensile force acts by the bending force in the surface direction as described above, an unreasonable force is applied on a wiring pattern of the flexible printed circuit board so that it possibly becomes difficult to maintain a good wiring state.

Meanwhile, the invention is not limited to the above embodiment, but changes, modifications or the like can be made if necessary. That is, various changes can be made without departing from the essence of the invention. In addition, a material, a shape and a dimension of each component, the number of components, a placement position of each component and the like in the above embodiment are arbitrary as long as the invention can be achieved so that they are not limited. While, for example, the second deflection portion of the straight section is achieved such that the projections formed on the wiring member attachment section are engaged with the hole sections of the wiring member, the second deflection portion can be formed such that a predetermined portion of the wiring member is bent in an arc shape by processing beforehand.

This application is based on Japanese Patent Application (JP-2010-099194) filed on Apr. 22, 2010, the contents of which are incorporated herein by reference.

Industrial Applicability

In accordance with the wiring member of the invention, even when dimensional tolerances of outside dimensions of the plurality of batteries are accumulated, and thereby a position of connection to the terminal of the branch section is deviated, it is possible to eliminate a trouble that the wiring member is twisted by the deviation so as to cause an unreasonable force to act thereon, so that a good wiring state can be maintained with high reliability.

DESCRIPTION OF REFERENCE NUMERALS AND SIGNS

11 wiring member
12 battery connection plate (plate)
21 straight section
22 branch section
32 deflection portion
41 projection
42 hole section
43 second deflection portion

The invention claimed is:

1. A wiring member which is formed of a flexible printed circuit board for connecting to terminals of a plurality of batteries, the wiring member comprising:
   a straight section which is disposed along an arrangement of the aligned terminals; and
   a plurality of branch sections which extend toward positions of connection to the respective terminals from the straight section so as to be connected to the terminals,
   wherein the branch sections have deflection portions configured to deform in response to a displacement of the straight section in a lengthwise direction of the straight section,
   wherein the deflection portions have at least one slot extending parallel to the lengthwise direction.

2. The wiring member according to claim 1, wherein an extending direction of the plurality of branch sections is substantially perpendicular to the lengthwise direction of the straight section.

3. The wiring member according to claim 1, wherein the straight section includes a second deflection portion which is deformed in response to expansion or contraction of the straight section in the lengthwise direction thereof.

4. The wiring member according to claim 3, wherein the second deflection portion is formed so that a plurality of projections provided at a predetermined pitch on a plate to be attached to the batteries are inserted into a plurality of hole sections which are opened on the straight section at a pitch larger than the pitch of the projections.

5. The wiring member according to claim 1, wherein each of the deflection portions includes cut-out portions formed therein corresponding to said at least one slot.

6. The wiring member according to claim 5, wherein the cut-out portions are alternately arranged in the branch sections, respectively.

7. The wiring member according to claim 6, wherein the cut-out portions are arranged in a direction substantially parallel with the lengthwise direction of the straight section.

* * * * *